US009864938B2

United States Patent
Kawabata et al.

(10) Patent No.: US 9,864,938 B2
(45) Date of Patent: Jan. 9, 2018

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventors: Nobuhide Kawabata, Kanagawa (JP); Yasuhiro Mori, Kanagawa (JP); Takeshi Fukui, Kanagawa (JP); Shinsuke Tsuda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/091,241

(22) Filed: Apr. 5, 2016

(65) Prior Publication Data

US 2017/0116503 A1 Apr. 27, 2017

(30) Foreign Application Priority Data

Oct. 22, 2015 (JP) ................................. 2015-208211

(51) Int. Cl.
*G06K 15/00* (2006.01)
*G06F 3/12* (2006.01)
(52) U.S. Cl.
CPC ........... *G06K 15/408* (2013.01); *G06F 3/121* (2013.01); *G06F 3/1253* (2013.01)
(58) Field of Classification Search
CPC ...... G06K 15/408; G06F 3/121; G06F 3/1253
USPC ...................................................... 358/1.14
See application file for complete search history.

(56) References Cited

U.S. PATENT DOCUMENTS

| | | | | |
|---|---|---|---|---|
| 5,159,546 A | * | 10/1992 | Inoue | G03G 15/502 399/81 |
| 2007/0201050 A1 | * | 8/2007 | Mochizuki | H04N 1/00408 358/1.1 |
| 2007/0237537 A1 | * | 10/2007 | Hasegawa | G03G 15/55 399/81 |
| 2011/0228329 A1 | * | 9/2011 | Suzuki | G03G 15/6541 358/1.15 |
| 2012/0252441 A1 | | 10/2012 | Fujimoto et al. | |

(Continued)

FOREIGN PATENT DOCUMENTS

| | | |
|---|---|---|
| JP | H11-231729 A | 8/1999 |
| JP | 2002-244504 A | 8/2002 |

(Continued)

*Primary Examiner* — Allen H Nguyen
(74) *Attorney, Agent, or Firm* — Oliff PLC

(57) ABSTRACT

An information processing apparatus includes an abnormal status detector and a display controller. The abnormal status detector detects an abnormal status of an image forming apparatus. The display controller controls, when the abnormal status detector detects the abnormal status, such that operation procedure images which are associated with plural operations defined in advance as operations to be performed by an operator in the abnormal status of the image forming apparatus are displayed on a display on which an operation screen regarding the image forming apparatus is displayed. When receiving a first operation which corresponds to a first operation procedure image displayed on the display, the display controller displays a second operation procedure image which corresponds to a second operation which is defined as the operation next to the first operation among the plural operations.

8 Claims, 9 Drawing Sheets

(56) References Cited

U.S. PATENT DOCUMENTS

| | | | |
|---|---|---|---|
| 2013/0163032 A1* | 6/2013 | Hamano | G06F 3/1296 358/1.14 |
| 2013/0321849 A1* | 12/2013 | Masui | G06K 15/1809 358/1.14 |
| 2014/0036299 A1* | 2/2014 | Norota | G06F 3/121 358/1.14 |
| 2014/0160511 A1 | 6/2014 | Yamada | |

FOREIGN PATENT DOCUMENTS

| | | |
|---|---|---|
| JP | 2008-262432 A | 10/2008 |
| JP | 2012-039537 A | 2/2012 |
| JP | 2012-216982 A | 11/2012 |
| JP | 2013-235500 A | 11/2013 |

* cited by examiner

FIG. 4

| OCCURRENCE POINT | DETECTION POINT | ERROR LEVEL | PROCEDURE | | | | | | | | |
|---|---|---|---|---|---|---|---|---|---|---|---|
| | | | PLEASE CONFIRM SETTING/ OPERATION | SUPPORT REQUEST STARTS | PLEASE COLLECT LOGS | PLEASE CONTACT MAKER | PLEASE TRANSFER LOGS | RECEIVED | FAILURE IS BEING ANALYZED | FIRST RESPONSE IS COMPLETED | SUPPORT IS COMPLETED |
| IMAGE FORMING UNIT | HARDWARE | UNRECOVERABLE ERROR | | | AUTOMATIC COLLECTION | ○ | ○ | ○ | ○ | ○ | ○ |
| | | SERIOUS ERROR | ○ | ○ | ○ | ○ | ○ | ○ | ○ | ○ | ○ |
| | | WARNING | ○ | ○ | ○ | | | | | | ○ |
| CONTROLLER | HARDWARE | UNRECOVERABLE ERROR | | | AUTOMATIC COLLECTION | ○ | ○ | ○ | ○ | ○ | ○ |
| | | SERIOUS ERROR | ○ | ○ | ○ | ○ | ○ | ○ | ○ | ○ | ○ |
| | | WARNING | ○ | | ○ | | | | | | ○ |
| | SOFTWARE | UNRECOVERABLE ERROR | | | AUTOMATIC COLLECTION | ○ | ○ | ○ | ○ | ○ | ○ |
| | | SERIOUS ERROR | ○ | ○ | ○ | ○ | ○ | ○ | ○ | ○ | ○ |
| | | WARNING | ○ | | ○ | | | | | | ○ |

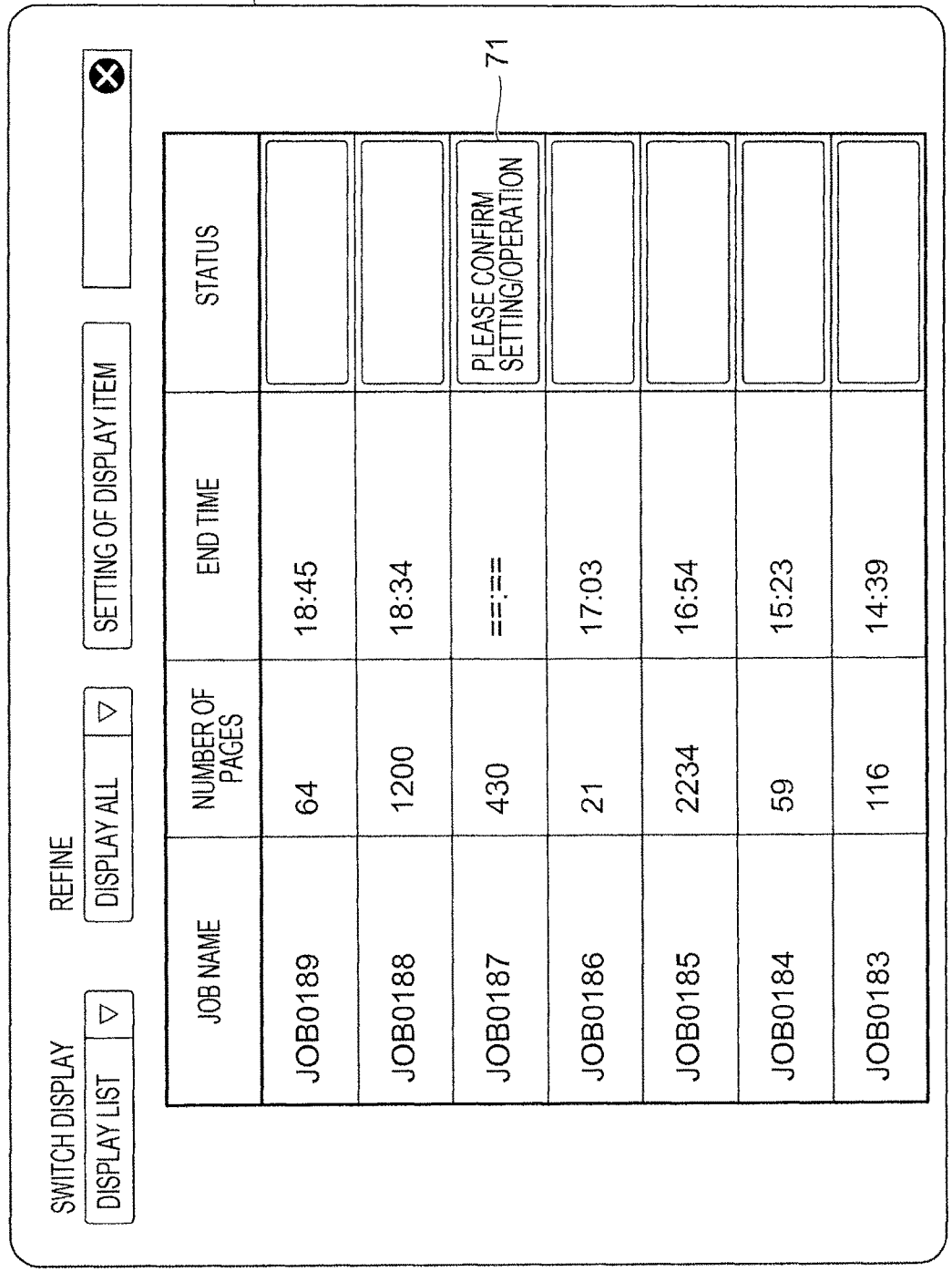

FIG. 9

| ERROR GROUPS | PROCEDURE | | | | | | | | |
|---|---|---|---|---|---|---|---|---|---|
| | LOG COLLECTION | PERIOD-DESIGNATED LOG COLLECTION | TIME-DESIGNATED LOG COLLECTION | LOG COLLECTION (AUTOMATIC) | INPUT DATA CONFIRMATION | ANALYSIS JOB COLLECTION | JOB REPROCESSING | SYSTEM RESTART | CONTACT MAKER |
| GROUP 1 | ○ | | | | | | | | ○ |
| GROUP 2 | | ○ | | | | | | | ○ |
| GROUP 3 | | | ○ | | | | ○ | | ○ |
| GROUP 4 | | | ○ | | | | | ○ | ○ |
| GROUP 5 | | | | ○ | | | | ○ | ○ |
| GROUP 6 | | | | | ○ | ○ | ○ | | ○ |
| GROUP 7 | | | | | ○ | ○ | | ○ | ○ |
| GROUP 8 | | | | | | ○ | ○ | | ○ |
| GROUP 9 | | | | | | ○ | | ○ | ○ |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-208211 filed Oct. 22, 2015.

BACKGROUND

Technical Field

The present invention relates to an information processing apparatus, an information processing method, and a non-transitory computer readable medium.

SUMMARY

According to an aspect of the invention, there is provided an information processing apparatus including an abnormal status detector and a display controller. The abnormal status detector detects an abnormal status of an image forming apparatus. The display controller controls, when the abnormal status detector detects the abnormal status, such that operation procedure images which are associated with plural operations defined in advance as operations to be performed by an operator in the abnormal status of the image forming apparatus are displayed on a display on which an operation screen regarding the image forming apparatus is displayed. When receiving a first operation which corresponds to a first operation procedure image displayed on the display, the display controller displays a second operation procedure image which corresponds to a second operation which is defined as the operation next to the first operation among the plural operations.

BRIEF DESCRIPTION OF THE DRAWINGS

Exemplary embodiments of the present invention will be described in detail based on the following figures, wherein:

FIG. 4 is a diagram illustrating an example of a processing procedure table;

FIG. 6 is a diagram for explaining a specific example of a process in which the controller displays an operation procedure image;

FIG. 9 is a diagram illustrating an example of an operation procedure table which defines the operation procedure images illustrated in FIG. 8.

DETAILED DESCRIPTION

Hereinafter, exemplary embodiments of the present invention will be described in detail with reference to attached drawings.

<Explanation of Entire Configuration of Image Forming Apparatus>

Figure 1:
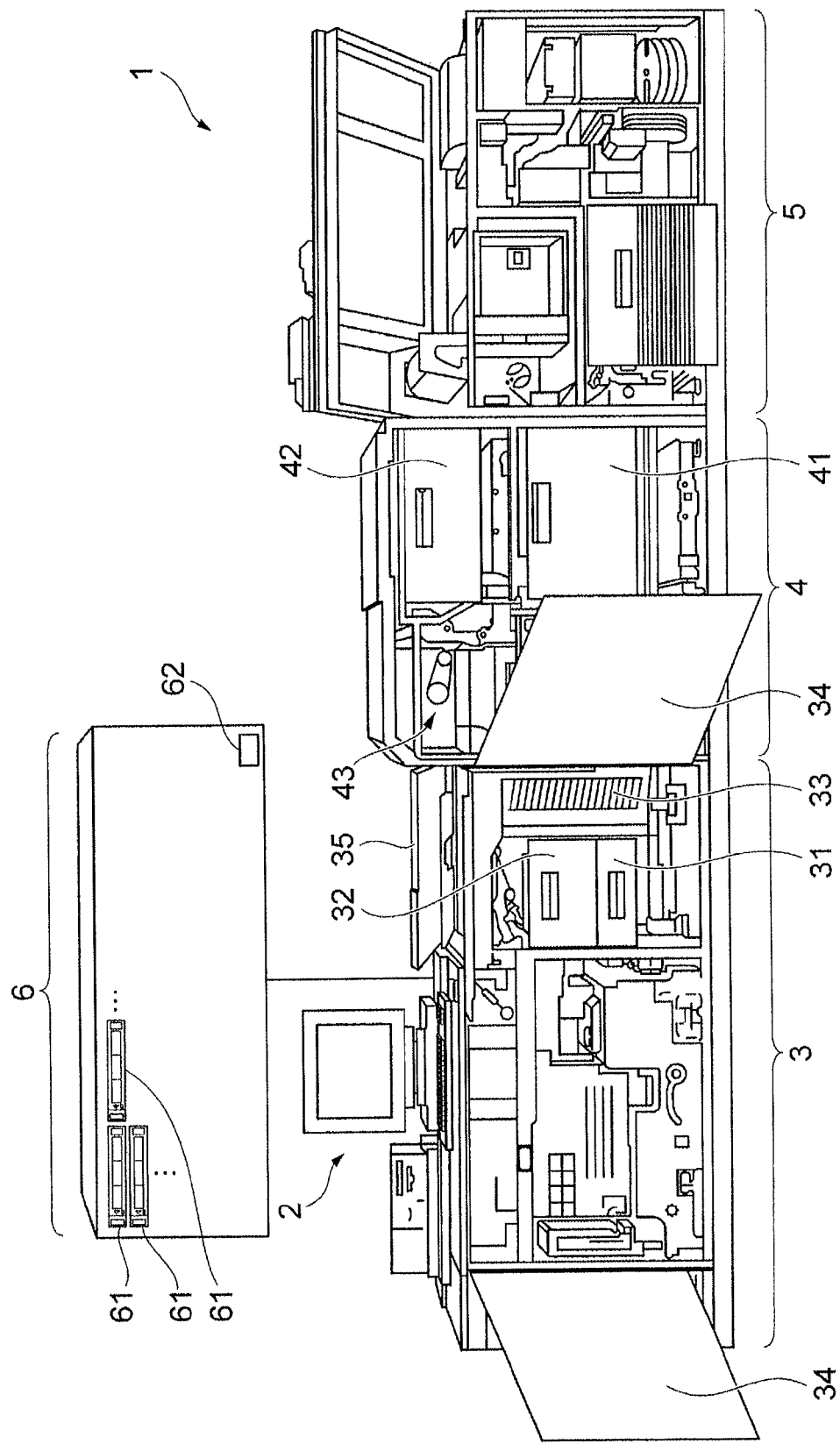
FIG. 1 is a diagram illustrating an example of the entire configuration of an image forming apparatus according to an exemplary embodiment.

FIG. 1 is a diagram illustrating an example of the entire configuration of an image forming apparatus 1 according to an exemplary embodiment.

The image forming apparatus 1 includes a controller 2 which controls each functional unit of the image forming apparatus 1 and an image forming unit 3 as a printing mechanism for forming an image on paper (a recording material or a recording medium). The image forming apparatus 1 also includes a paper storage unit 4 which stores paper to be used by the image forming unit 3, a post-processing unit 5 which performs post-processing for paper on which an image has been formed by the image forming unit 3, and a memory 6 which stores printing data (image data) to be supplied to the image forming unit 3.

In this exemplary embodiment, the controller 2 has a function as an example of an information processing apparatus.

The controller 2 of the image forming apparatus 1 is connected to a network, which is not illustrated in FIG. 1, and receives printing data from a personal computer (PC), which is not illustrated in FIG. 1, via the network. The controller 2 also processes the received printing data and temporarily causes the printing data to be stored in the memory 6. The controller 2 sequentially reads the printing data from the memory 6 at a printing speed of the image forming unit 3, and transmits the read printing data to the image forming unit 3.

The controller 2 also monitors the status of the image forming apparatus 1. In the case where an abnormality has occurred at the image forming apparatus 1, the controller 2 displays an image which is associated with an operation to be performed by an operator in the abnormality status of the image forming apparatus 1, so that the status is presented to the operator. Furthermore, the controller 2 displays the status of the memory 6, so that the status is presented to the operator.

Furthermore, the controller 2 causes log information which indicates histories of various processes performed at the image forming apparatus 1 to be stored inside the controller 2, the memory 6, and the like. The controller 2 further includes an input device such as, for example, a touch panel and a keyboard so that the controller 2 receives an operation by the operator.

The image forming unit 3 forms an image on paper using multiple color materials, based on the printing data supplied from the controller 2. In this exemplary embodiment, the image forming unit 3 is, for example, of an electrophotographic system. That is, for example, a photoreceptor formed in a drum shape is uniformly charged, the photoreceptor is exposed to light which is controlled based on printing data, and an electrostatic latent image is thus formed on the photoreceptor. Then, a developing device develops the electrostatic latent image to a visible image using toner, which is a color material, (toner image). The image forming unit 3 transfers the toner image to paper, and forms an image by applying heat and pressure with a fixing device and fixing the toner image to the paper.

The image forming unit 3 is not necessarily of the electrophotographic system. The image forming unit 3 may be of an inkjet system in which ink as a color material is discharged onto a recording medium so that an image is formed.

Furthermore, the image forming unit 3 also includes paper trays 31 and 32, which are provided separately from paper trays 41 and 42 provided in the paper storage unit 4, which will be described later. Furthermore, a conveyance system, which is not illustrated in FIG. 1, is provided for conveyance of paper from the paper trays 31 and 32 to the image forming unit 3.

Furthermore, the image forming unit 3 also includes a discharge tray unit 33. Paper on which an image has been formed at the image forming unit 3 is discharged to the discharge tray unit 33 in a case where post-processing is not required to be performed at the post-processing unit 5.

The image forming unit 3 has opening/closing lids 34 and 35. By opening the opening/closing lids 34 and 35, maintenance including adjustment of each mechanism unit of the image forming unit 3, replacement of consumables, and deletion of paper at the occurrence of a jam (paper clogging) may be performed.

The paper storage unit 4 includes the paper trays 41 and 42. The paper trays 41 and 42, as well as the paper trays 31 and 32, store paper. Paper corresponding to printing data is selected by the controller 2, and paper is taken out from any of the paper trays 31, 32, 41, and 42 and conveyed to the image forming unit 3 by the conveyance system, which is not illustrated in FIG. 1.

The paper storage unit 4 is a so-called option device. In the case where the types of paper stored in the paper trays 31 and 32 of the image forming unit 3 are not sufficient, the paper storage unit 4 may be additionally provided. Therefore, if the types of paper stored in the paper trays 31 and 32 are sufficient, the paper storage unit 4 is not necessarily provided.

Furthermore, the paper storage unit 4 also includes a paper conveyance part 43 at an upper part of the paper storage unit 4. In the case where post-processing is performed at the post-processing unit 5, paper is conveyed to the post-processing unit 5 from the image forming unit 3 by the paper conveyance part 43.

The post-processing unit 5 performs post-processing, such as cutting, folding processing, punching holes, binding, and bookbinding, for the paper on which an image is formed. The post-processing unit 5 is also a so-called option device. In the case where post-processing is not required, the post-processing unit 5 is not necessarily connected.

The memory 6 stores printing data which is received from a PC, which is not illustrated in FIG. 1. For example, several tens to several hundreds of hard disk drives (HDDs) 61 are mounted at the memory 6, and printing data is stored in the HDDs 61. The HDDs 61 each have a capacity of, for example, 500 gigabytes or 1 terabytes. The memory 6 has a storage region with such a large capacity. By sequentially transmitting printing data from the memory 6 to the image forming unit 3 at a printing speed of the image forming unit 3, printing is performed such that intermittent printing (that is, printing operations with regular intervals) does not occur.

Furthermore, the HDDs 61 mounted at the memory 6 each include attribute information which indicates the internal status of the HDD 61. The controller 2 is notified of the attribute information of each of the HDDs 61, and therefore understands the statuses of the HDDs 61. For example, self-monitoring, analysis and reporting technology (S.M.A.R.T.) is used as attribute information. S.M.A.R.T. represents information of the internal status of a hard disk drive which is issued by the hard disk drive itself in order that early detection of a failure at the hard disk drive and prediction of a trouble are achieved.

The memory 6 further includes a power supply unit 62. The power supply unit 62 supplies power to each of the HDDs 61 under the control of the controller 2.

<Example of Functional Configuration of Controller>

Figure 2:
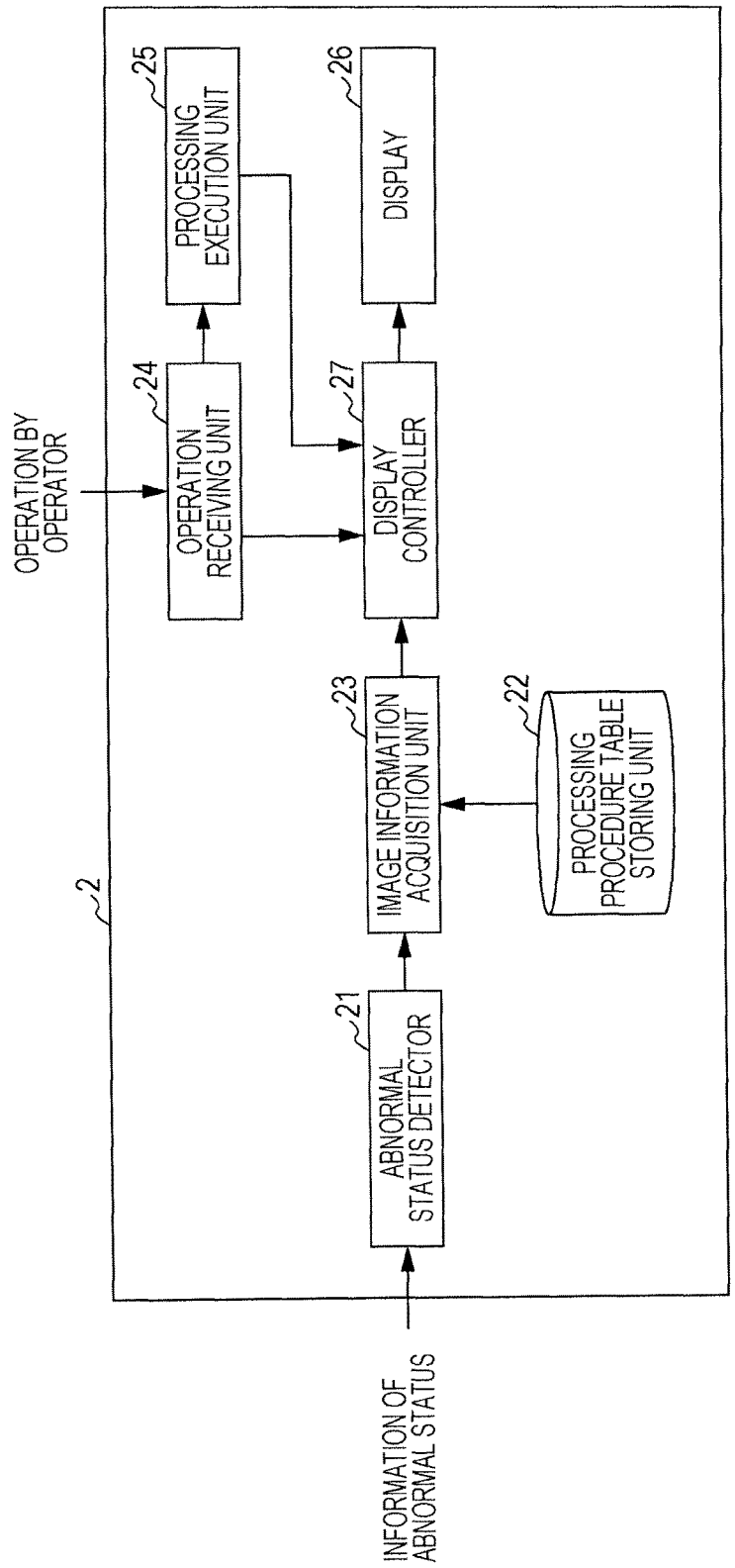
FIG. 2 is a block diagram illustrating an example of a functional configuration of a controller.

Next, a functional configuration of the controller 2 provided in the image forming apparatus 1 will be described. FIG. 2 is a block diagram illustrating an example of the functional configuration of the controller 2.

The controller 2 includes an abnormal status detector 21 which detects the abnormal status of the image forming apparatus 1, a processing procedure table storing unit 22 which stores a table (hereinafter, referred to as a processing procedure table) in which a processing procedure to be performed in the abnormal status of the image forming apparatus 1 is defined in advance for each abnormal status, and an image information acquisition unit 23 which acquires information of an image displayed in the detected abnormal status by referring to the processing procedure table. The controller 2 also includes an operation receiving unit 24 which receives an operation by an operator, a processing execution unit 25 which executes processing designated by the received operation, a display 26 which displays various images, and a display controller 27 which controls the display contents of the display 26.

The abnormal status detector 21 monitors the status of the image forming apparatus 1. When an abnormality has occurred at the image forming apparatus 1, the abnormal status detector 21 acquires information regarding the abnormal status, such as an error, and detects that the image forming apparatus 1 is in the abnormal status. For example, when an error has occurred during printing at the image forming unit 3, the abnormal status detector 21 acquires information of the error at the image forming unit 3, and detects that the image forming unit 3 is abnormal.

The processing procedure table storing unit 22 stores a predetermined processing procedure table. As described above, a processing procedure to be performed in the abnormal status of the image forming apparatus 1 is defined for each abnormal status in the processing procedure table. Furthermore, in the processing procedure table, an operation procedure image is associated with each of multiple processing operations included in each processing procedure. An operation procedure image is an image which represents an operation to be performed by an operator and conditions of support for an abnormality. The details of an operation procedure image will be described later.

When the abnormal status detector 21 detects the abnormal status of the image forming apparatus 1, the image information acquisition unit 23 refers to the processing procedure table to acquire information of a processing procedure to be performed in the detected abnormal status. The image information acquisition unit 23 acquires the details of the processing procedure to be performed in the abnormal status and information of an operation procedure image corresponding to each of multiple processing operations included in the processing procedure.

The operation receiving unit 24 receives an operation by an operator using, for example, a touch panel, a keyboard, or the like. For example, in the case where an abnormality has occurred at the image forming apparatus 1 and an operation procedure image is displayed on the display 26, the operation receiving unit 24 receives an operation corresponding to the displayed operation procedure image. The operation receiving unit 24 may detect that an operator has performed replacement of consumables, paper deletion for a paper jam, or the like and receive the detection result as an operation by the operator.

When the operation receiving unit 24 receives an operation corresponding to the operation procedure image, the processing execution unit 25 performs a series of processing operations designated by the received operation. For example, in the case where an operation procedure image for log collection is displayed on the display 26, an operator performs an operation designating log collection, and the processing execution unit 25 collects log information of the image forming apparatus 1.

Furthermore, in the case where execution of the series of designated processing operations is completed, the processing execution unit 25 notifies the display controller 27 of completion of the processing.

The display 26 displays various screens including, for example, an operation screen regarding the image forming apparatus 1, in accordance with a control signal transmitted from the display controller 27.

The display controller 27 generates a control signal for controlling display at the display 26, and controls the display contents of the display 26. When the abnormal status detector 21 detects the abnormal status of the image forming apparatus 1, the display controller 27 displays an operation procedure image on the display 26, based on information of the operation procedure image acquired by the image information acquisition unit 23.

Specifically, when the abnormal status detector 21 detects the abnormal status of the image forming apparatus 1, the display controller 27 first displays an operation procedure image which is associated with the first operation to be performed at first by an operator for the detected abnormal status on the display 26, based on information of the operation procedure image acquired by the image information acquisition unit 23. Next, the operation corresponding to the operation procedure image displayed on the display 26 is performed. When a series of processing operations designated by the operation is completed, the display controller 27 displays an operation procedure image which is associated with the next operation to be performed next by the operator on the display 26. Accordingly, the display controller 27 performs control for sequentially displaying operation procedure images in accordance with a processing procedure to be performed in the abnormal status of the image forming apparatus 1.

Furthermore, in this exemplary embodiment, the abnormal status detector 21 has a function as an example of an abnormal status detector. The operation receiving unit 24 and the display controller 27 have functions as an example of a display controller.

<Hardware Configuration of Controller>

Figure 3:
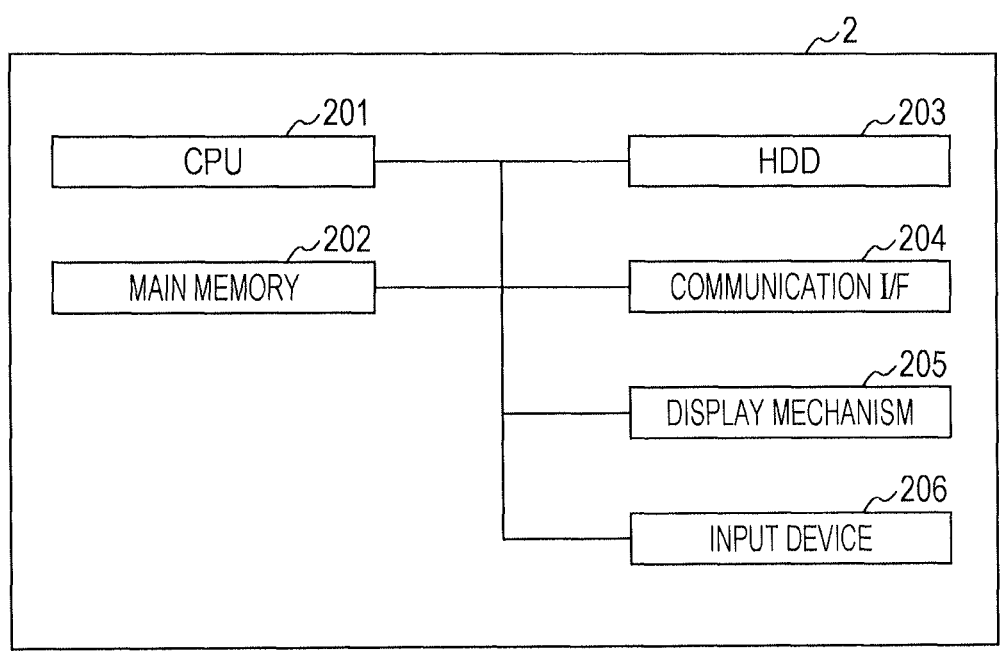
FIG. 3 is a diagram illustrating an example of a hardware configuration of the controller.

Next, a hardware configuration of the controller 2 will be described. FIG. 3 is a diagram illustrating an example of a hardware configuration of the controller 2. As illustrated in FIG. 3, the controller 2 includes a central processing unit (CPU) 201, which is provided as an arithmetic unit, and a main memory 202 and an HDD 203, which are provided as a memory.

The CPU 201 executes various programs such as an operating system (OS) and an application, and implements each function of the controller 2. The main memory 202 is a storing region in which various programs, data to be used for execution of the various programs, and the like are stored. The HDD 203 is a storing region in which input data to the various programs, output data from the various programs, and the like are stored. The controller 2 further includes a communication interface (I/F) 204 for performing communication with an external apparatus, a display mechanism 205 which includes a video memory, a display, and the like, and an input device 206 such as a touch panel, a keyboard, and the like.

The various functional units of the controller 2 illustrated in FIG. 2 are implemented when software and hardware resources cooperate with each other. Specifically, when the CPU 201 reads programs for implementing the abnormal status detector 21, the image information acquisition unit 23, the operation receiving unit 24, the processing execution unit 25, the display controller 27, and the like, for example, from the HDD 203 to the main memory 202 and executes the read programs, the above functional units are implemented. Furthermore, the processing procedure table storing unit 22 is implemented by, for example, the HDD 203. The operation receiving unit 24 is implemented by, for example, the input device 206. The display 26 is implemented by, for example, the display mechanism 205.

<Explanation of Processing Procedure Table>

Next, a processing procedure table stored in the processing procedure table storing unit 22 will be described. FIG. 4 is a diagram illustrating an example of a processing procedure table.

First, items defined in the processing procedure table will be described.

"Occurrence point" represents a point at which an abnormality has occurred. "Occurrence point" includes the image forming unit 3 and the controller 2. In the example illustrated in FIG. 4, although items corresponding to the paper storage unit 4, the post-processing unit 5, and the memory 6 of the image forming apparatus 1 are not provided. However, the above items may be provided. "Detection point" represents a point at which an abnormality is detected. "Detection point" includes a physical point in the hardware implementation and a logical point in the software implementation. "Error level" represents the level of an error which has occurred. "Error level" includes an unrecoverable error, a serious error, and a warning, for example.

An "unrecoverable error" represents system down. An error occurring in a serious abnormal status which causes an operation stop state, such as a hardware failure, a CPU error, and a temperature abnormality, corresponds to an "unrecoverable error". Furthermore, an error which has a lower degree of seriousness than an unrecoverable error but requires quick measures to be taken corresponds to a "serious error". In the case of the image forming unit 3, for example, an error which indicates power disconnection during printing or the like corresponds to a "serious error". Furthermore, in the case of the controller 2, for example, an uninterruptible power supply (UPS) error, a task activation error, and the like correspond to a "serious error". Furthermore, an error which has a lower degree of seriousness than a serious error but requires some measures to be taken corresponds to a "warning". In the case of the image forming unit 3, for example, a paper jam, replacement of consumables, and the like correspond to a "warning". Furthermore, in the case of the controller 2, for example, a setting error, a license error, and the like correspond to a "warning".

Classification as to which one of items (error levels): "unrecoverable error", "serious error", and "warning" individual errors occurring at the image forming apparatus 1 belong to is determined in advance.

Next, "procedure" represents a processing procedure to be performed in an abnormal status. In the example illustrated in FIG. 4, messages displayed on the display 26 are illustrated as operation procedure images. Specifically, messages "Please confirm setting/operation", "Support request starts", "Please collect logs", "Please contact maker", "Please transfer logs", "Received", "Failure is being analyzed", "First response is completed", and "Support is completed" are displayed as operation procedure images on the display 26, in accordance with an error level. At each error level, in the case where a circle is provided in the field of "procedure", a message displayed at the error level (that is, an operation procedure image) is displayed.

The operation procedure images: "Please confirm setting/operation", "Support request starts", "Please collect logs", "Please contact maker", and "Please transfer logs", are associated with operations which are defined in advance as operations to be performed by an operator in the abnormal status of the image forming apparatus 1. In other words, such operation procedure images are images which remind an operator of operations to be performed by the operator and which guide the operator to perform operations to be performed when the image forming apparatus 1 is in the abnormal status.

"Please confirm setting/operation" is an operation procedure image which notifies an operator of occurrence of an abnormality at the image forming apparatus 1 and urges the operator to confirm the setting and operation status of the image forming apparatus 1.

"Support request starts" is an operation procedure image for starting a support request to a manufacturer (maker). For example, when an operator selects a button of this operation procedure image, processing for requesting a maker for support starts.

"Please collect logs" is an operation procedure image which requires an operator to collect log information of the image forming apparatus 1. For example, when the operator selects a button of this operation procedure image, an instruction for collecting log information is issued to the controller 2. In the case where "automatic collection" is indicated in the field of "Please collect logs", the operation procedure image "Please collect logs" is not displayed, and execution of (automatic) log collection without any operation by the operator is indicated.

For example, in the case where an "unrecoverable error" has occurred, it is considered that an operation stops and printing does not continue to be performed. Therefore, log collection is automatically performed without any operation by the operator. In contrast, in the case where a "serious error" or a "warning" has occurred, printing may continue to be performed. Therefore, automatic log collection is not performed in order that a printing operation is not affected by a load of log collection, and log collection is performed at a timing selected by a user.

"Please contact maker" is an operation procedure image which requires an operator to contact the maker by telephone, electronic mail, or the like. When confirming this operation procedure image, the operator may contact the maker to report the abnormal status of the image forming apparatus 1 and request the maker for support for restoration.

"Please transfer logs" is an operation procedure image which requires an operator to transfer log information collected at the controller 2 to the maker. For example, when the operator selects a button of this operation procedure image, the log information collected by the controller 2 is transferred to the maker via a network, which is not illustrated in FIG. 1.

Next, the operation procedure images "Received", "Failure is being analyzed", "First response is completed", and "Support is completed" present support statuses of a maker to an operator. Such operation procedure images are displayed during support by the maker after the operator transfers log information to the maker. The display controller 27 sequentially displays the operation procedure images in accordance with the support status of the maker.

"Received" is an operation procedure image which represents that a maker receives log information of the image forming apparatus 1 and receives a support request from an operator.

"Failure is being analyzed" is an operation procedure image which represents a failure is being analyzed at the maker.

"First response is completed" represents an operation procedure image which represents that a first response is completed by the maker. In the case where as a result of failure analysis by the maker, information of categorization of the failure (abnormality status), countermeasures against the failure, and the like is notified as a first response to an operator, the operation procedure image is displayed.

"Support is completed" is an operation procedure image which represents that support by the maker is completed. For example, if a program needs to be updated for restoration of the image forming apparatus 1, information of a restoration program, the time at which the restoration program is to be provided, and the like may also be reported to an operator.

For example, an example of the case where a "serious error" or a "warning" has occurred at the image forming unit 3 will be described below.

When a "serious error" or a "warning" has occurred at the image forming unit 3, the operation procedure image "Please confirm setting/operation" is displayed. When an operator confirms the setting and operation status of the image forming apparatus 1, and, for example, selects this operation procedure image, the operation procedure image "Support request starts" is displayed. Then, when the operator, for example, selects the operation procedure image, a process for requesting a maker for support starts. Then, the operation procedure image "Please collect logs" is displayed. Then, when the operator performs an operation for collecting logs and log collection is completed, the operation procedure image "Please contact maker" is displayed. When the operator contacts the maker, the operation procedure image "Please transfer logs" is displayed. Then, when the operator performs an operation for log transfer and the maker receives log information, the operation procedure image "Received" is displayed. After that, in accordance with the support status of the maker, the operation procedure images "Failure is being analyzed", "First response is completed", and "Support is completed" are sequentially displayed.

Furthermore, for example, a case where an "unrecoverable error" has occurred at the image forming unit 3 will be described. When an "unrecoverable error" has occurred at the image forming unit 3, the controller 2 first performs log collection of the image forming apparatus 1 automatically without any operation by an operator. When log collection is completed, the operation procedure image "Please contact maker" is displayed. Then, as in the case where a "serious error" or a "warning" has occurred at the image forming unit 3, operation procedure images are sequentially displayed in accordance with operations by the operator and the support status of the maker.

<Explanation of Procedure for Displaying Operation Procedure Image>

Figure 5:
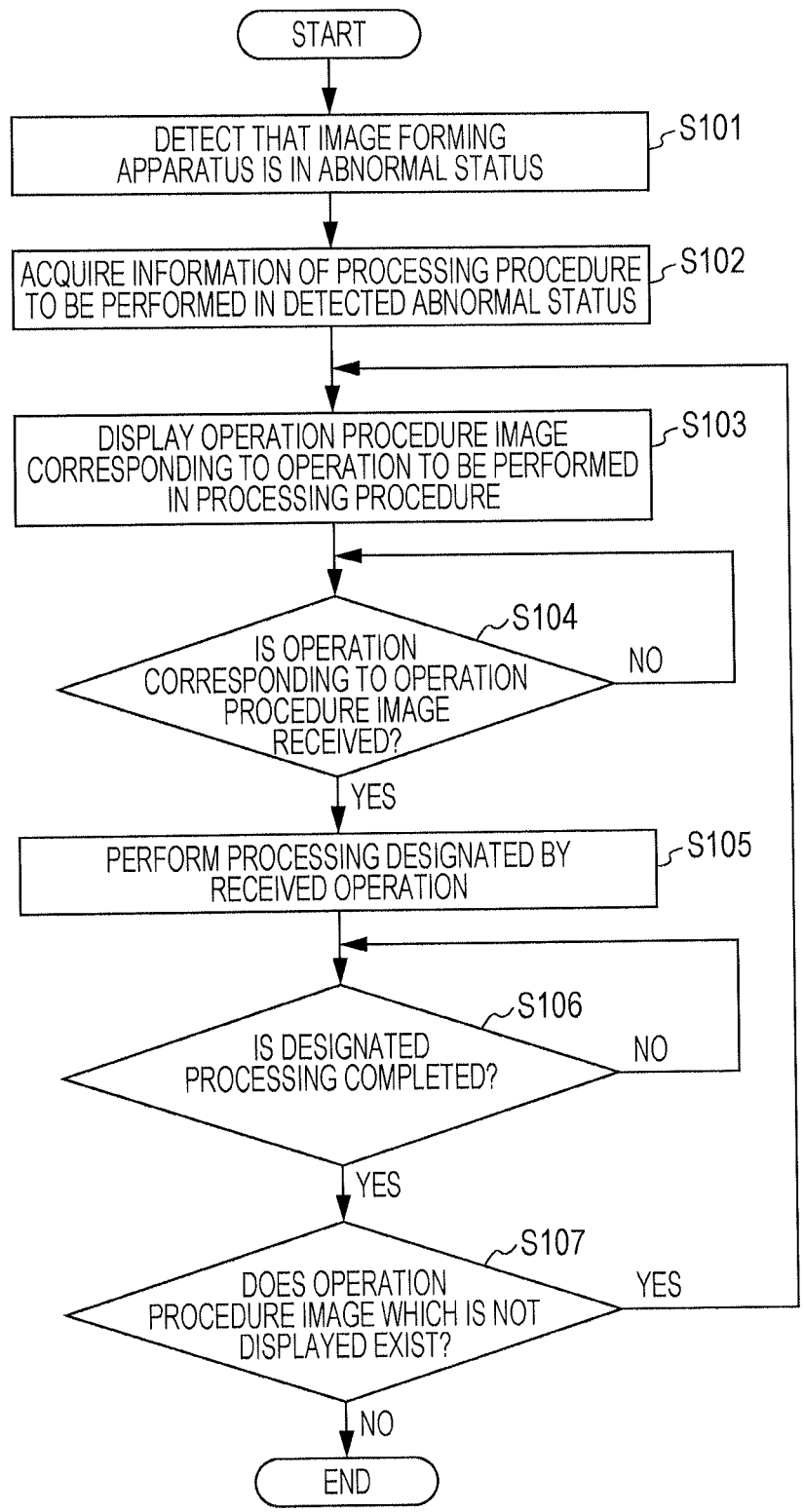
FIG. 5 is a flowchart illustrating an example of a procedure in which the controller displays an operation procedure image.

Next, a procedure in which the controller 2 causes operation procedure images to be displayed will be described with reference to a flowchart. FIG. 5 is a flowchart illustrating an example of a procedure in which the controller 2 causes operation procedure images to be displayed. A procedure for displaying operation procedure images for guiding an operator to perform operations such as "Please confirm setting/operation", "Support request starts", "Please collect logs", "Please contact maker", and "Please transfer logs" will be described below.

First, when an abnormality has occurred at the image forming apparatus 1, the abnormal status detector 21 acquires information of an error regarding an abnormal status or the like and detects that the image forming apparatus 1 is in the abnormal status (step 101). Next, the image information acquisition unit 23 acquires information of a processing procedure to be performed in the detected abnormal status by referring to the processing procedure table, based on the information of the abnormal status acquired by the abnormal status detector 21 (step S102). The image information acquisition unit 23 acquires the contents of the processing procedure to be performed in the abnormal status and information of operation procedure images corresponding to multiple processing operations included in the processing procedure.

Next, based on the information of the operation procedure images acquired by the image information acquisition unit 23, the display controller 27 displays an operation procedure image which corresponds to an operation to be performed in the processing procedure on the display 26 (step 103). The display controller 27 displays an operation procedure image which corresponds to the first operation to be performed at first by the operator among the multiple operation procedure images in the processing procedure. Next, the operation receiving unit 24 determines whether or not the operation corresponding to the displayed operation procedure image is received (step 104). When the determination result in step 104 is negative (No), the operation receiving unit 24 waits until the operation corresponding to the operation procedure image is received.

In contrast, when the determination result in step 104 is affirmative (Yes), the processing execution unit 25 performs processing designated by the operation received at the operation receiving unit 24 (step 105). For example, the processing execution unit 25 performs processing for collecting log information or processing for transferring log information to a maker. Next, the display controller 27 determines whether or not the designated processing is completed by the processing execution unit 25 (step 106). When receiving a notification indicating that the processing is completed from the processing execution unit 25, the display controller 27 determines that the processing is completed. When the determination result in step 106 is negative (No), the display controller 27 waits until a notification indicating that the processing is completed is received.

In contrast, when the determination result in step 106 is affirmative (Yes), the display controller 27 determines, based on the information of the operation procedure image acquired by the image information acquisition unit 23, whether or not an operation procedure image which is not displayed exists (step 107). When the determination result in step 107 is affirmative (Yes), the process proceeds to step 103, and the display controller 27 displays an operation procedure image corresponding to the next operation to be performed next by the operator on the display 26. In contrast, when the determination result in step 107 is negative (No), the processing flow ends.

After that, when the maker receives a support request from the operator, the display controller 27 sequentially displays operation procedure images in accordance with the support status of the maker. More specifically, after the support request is received at the maker, the support status is reported from the maker. Therefore, the display controller 27 is able to understand the support status of the maker based on the notification from the maker and display operation procedure images sequentially.

Furthermore, like the operation procedure images "Please confirm setting/operation" and "Support request starts", some operation procedure images require only operations by an operator but do not require processing by the processing execution unit 25. In this case, when the operator performs an operation corresponding to an operation procedure image, such as selection of the operation procedure image, the affirmative determination result (Yes) is obtained in step 104. Then, the subsequent processing of steps 105 and 106 is not performed, and the process proceeds to step 107.

Furthermore, in the case where the operation procedure image "Please contact maker" is displayed, for example, when the operator contacts the maker by electronic mail, transmission of an electronic mail is performed by the processing execution unit 25. In contrast, for example, when the operator contacts the maker by telephone, no processing is performed by the processing execution unit 25 in step 105. In this case, after contacting the maker by telephone, for example, the operator selects a button indicating that contact is completed. Thus, the affirmative determination result (Yes) is obtained in step 104. The subsequent processing of steps 105 and 106 is not performed, and the process proceeds to step 107.

<Explanation of Processing for Displaying Operation Procedure Image>

Figure 7A:
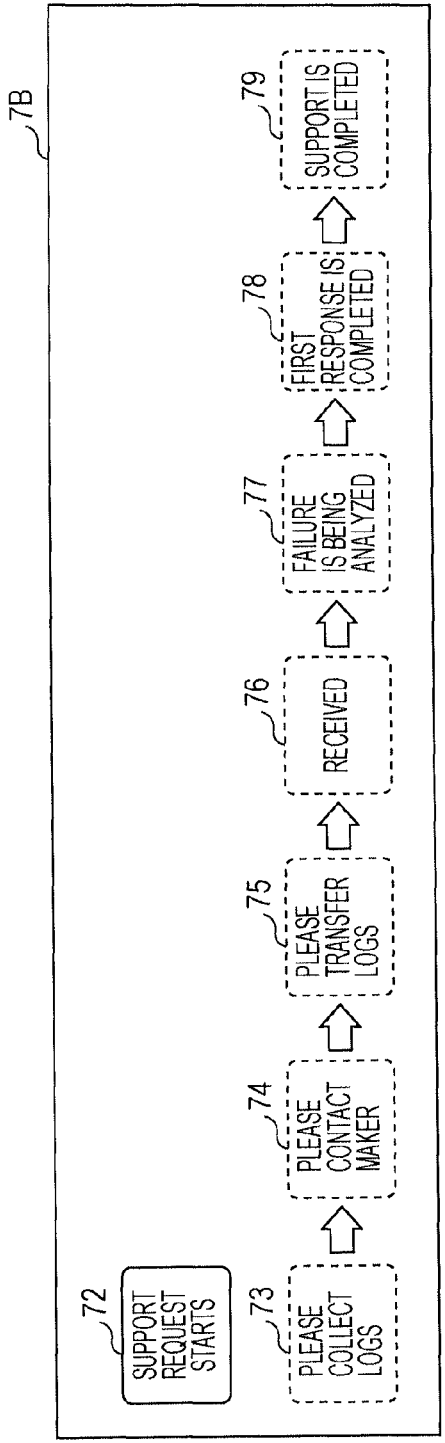
FIGS. 7A and 7B are diagrams for explaining specific examples of a process in which the controller displays operation procedure images.
Figure 7B:
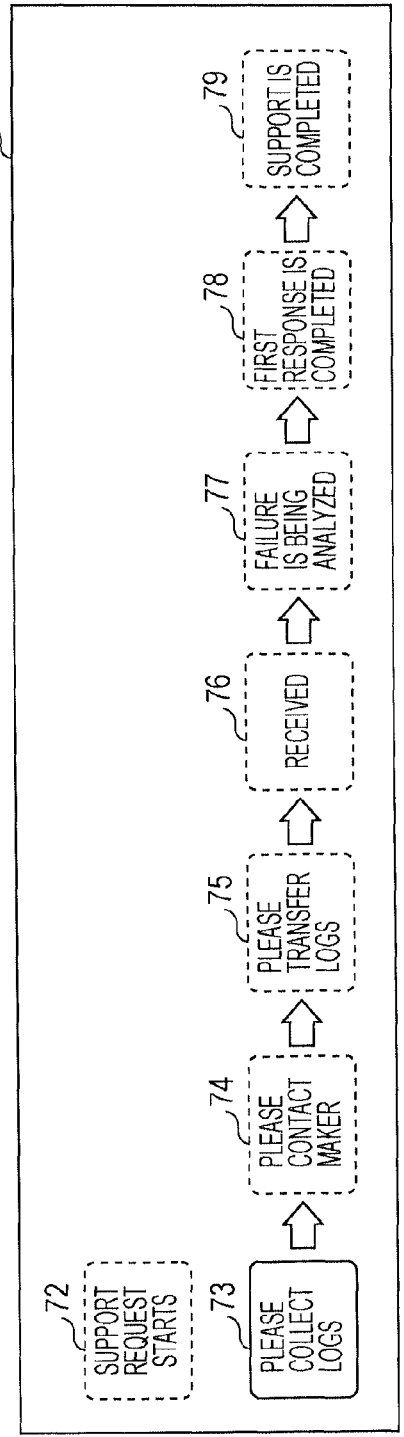

Next, processing in which the controller 2 causes operation procedure images to be displayed will be specifically described. FIG. 6 and FIGS. 7A and 7B are diagrams for explaining specific examples of processing in which the controller 2 causes operation procedure images to be displayed.

FIG. 6 is a diagram illustrating a list of print jobs to be displayed on the display 26. A print job includes image data to be printed and a control instruction in which settings for printing processing are described and is data in a unit of printing processing to be performed at the image forming apparatus 1. In a job list image 7A illustrated in FIG. 6, "job name", "number of pages", "end time", and "status" are indicated for each print job. The "job name" represents the name of a print job. The "number of pages" represents the number of pages for which a printing instruction is provided in a print job. The "end time" represents the time at which processing of a print job is completed, and a "status" represents the processing status of a print job.

As the "status" of the job name "JOB 0187", an operation procedure image 71 "Please confirm setting/operation" is displayed. In this case, an abnormality is detected during the processing of the print job with the job name "JOB 0187". Therefore, as an operation procedure image which is associated with the first operation to be performed at first by the operator in the abnormal status of the image forming apparatus 1, the operation procedure image 71 is displayed.

Next, the operator selects the operation procedure image 71, and a new image 7B illustrated in FIG. 7A is displayed. In this case, an operation which corresponds to the operation procedure image 71 is performed, and the display controller 27 therefore displays an operation procedure image 72 "Support request starts" as an operation procedure image which corresponds to the next operation to be performed next by the operator. In the image 7B illustrated in FIG. 7A, the operation procedure image 72 is displayed, whereas the other operation procedure images 73 to 79 are not displayed but are gray-out displayed (displayed such that they are not to be operated by a user).

Next, when the operator selects the operation procedure image 72, the image 7B changes from the state illustrate in FIG. 7A into the state illustrated in FIG. 7B. In this example, an operation which corresponds to the operation procedure image 72 is performed, and an operation procedure image 73 "Please collect logs" is therefore displayed as the operation procedure image which corresponds to the next operation to be performed next by the operator. In other words, the operation procedure image 73 changes from gray-out display into a state of being able to be operated by a user. While the operation procedure image 73 is displayed, the operation procedure image 72 is gray-out displayed. Furthermore, the other operation procedure images 74 to 79 are not still displayed but remain grayed out.

Similarly, in accordance with operations by the operator, the operation procedure image 74 and the operation procedure image 75 are displayed. For example, in the image 7B illustrated in FIG. 7B, when the operator selects the operation procedure image 73, the processing execution unit 25 performs log collection. Then, after log collection is completed, the display controller 27 displays the operation procedure image 74 "Please contact maker" as the operation procedure image which corresponds to the next operation to be performed next by the operator. In other words, the operation procedure image 74 changes from gray-out display into a state of being able to be operated by a user. Furthermore, while the operation procedure image 74 is displayed, the operation procedure image 73 is grayed out.

Furthermore, after the maker receives a support request from an operator, the operation procedure images 76 to 79 sequentially change from gray-out display into a state of being able to be operated by a user and are displayed in accordance with the support status of the maker.

Furthermore, in the example illustrated in FIGS. 7A and 7B, one operation procedure image is displayed, and the other operation procedure images are gray-out displayed. However, such a configuration is not necessarily provided. For example, one operation procedure image may be displayed in the field "status" illustrated in FIG. 6 and the other operation procedure images may not be gray-out displayed. In other words, in the case where a certain operation procedure image is displayed and then the next operation procedure image is displayed, the display controller 27 may display the next operation procedure image instead of the certain operation procedure image.

Furthermore, in the case where a certain operation procedure image is displayed and then the next operation procedure image is displayed, the display controller 27 may, for example, convert the certain operation procedure image into a size smaller than the next operation procedure image and display the reduced certain operation procedure image so that an operator is able to easily understand the contents to be operated.

Furthermore, in the case where an operation procedure image is displayed on the display 26, the operation receiving unit 24 may not receive an operation which is associated with a displayed image (drawing object) which is different from the displayed operation procedure image.

Furthermore, like multi-window display which allows multiple windows to be displayed at the same time, multiple windows (images) including an operation procedure image may be displayed in a superimposed manner on the display 26. In this case, for example, the display controller 27 may display the operation procedure image in the highest layer of one or more hierarchically displayed images so that an operator is able to easily understand the operation procedure image.

Furthermore, in order to highlight an operation procedure image, the display controller 27 may, for example, display the operation procedure image in a flashing manner.

<Different Example of Operation Procedure Image>

Figure 8:
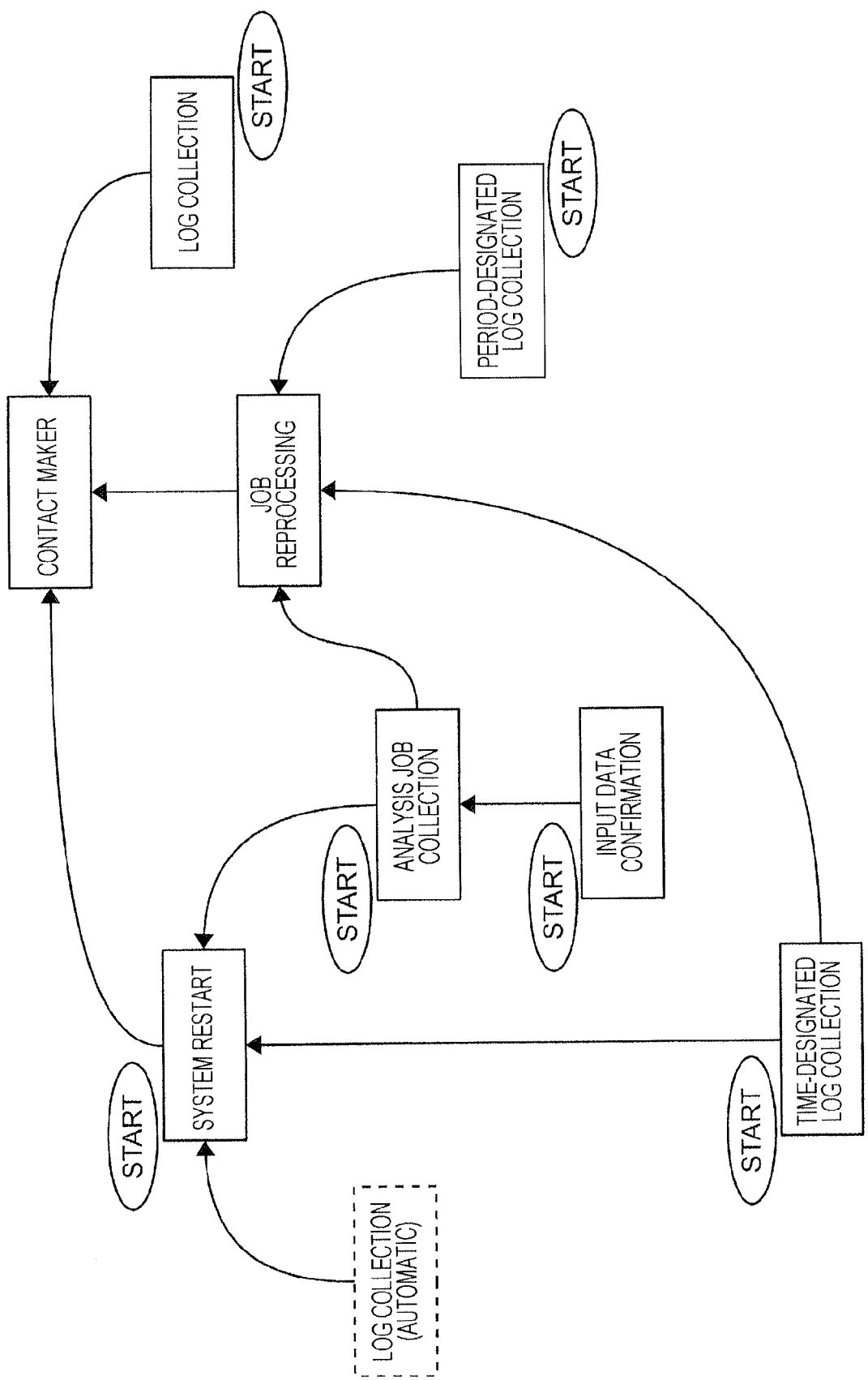
FIG. 8 is a diagram for explaining another example of operation procedure images.

Next, a different example of an operation procedure image will be described. FIG. 8 is a diagram for explaining a different example of operation procedure images. The example of FIG. 8 illustrates operation procedure images which correspond to operations to be performed by an operator by the time when the operator contacts the maker. Additionally, FIG. 8 illustrates a detailed example of operation procedures of "Please collect logs" and "Please contact maker" illustrated in FIG. 4.

Specifically, as operation procedure images, eight images: "log collection", "period-designated log collection", "time-designated log collection", "system restart", "input data confirmation", "analysis job collection", "job reprocessing", "contact maker", are illustrated.

"Log collection" is an operation procedure image for requiring an operator to collect log information of the image forming apparatus 1. "Period-designated log collection" is an operation procedure image for requiring an operator to collect log information for a designated period. "Time-designated log collection" is an operation procedure image for requiring an operator to collect log information for a designated time.

"System restart" is an operation procedure image for requiring an operator to restart the image forming apparatus 1. "Input data confirmation" is an operation procedure image for requiring an operator to confirm the status of an input print job. "Analysis job collection" is an operation procedure image for requiring an operator to collect data of a print job to be analyzed. "Job reprocessing" is an operation procedure image for requiring an operator to reprocess a print job which is being processed at the occurrence of an abnormality. "Contact maker" is an operation procedure image for requiring an operator to contact the maker by telephone, electronic mail, or the like.

Furthermore, "log collection (automatic)" which is surrounded by a broken line represents processing in which the controller 2 automatically collect log information without any operation by an operator.

When an abnormality has occurred at the image forming apparatus 1, operation is started from any of operations provided with "START" illustrated in FIG. 8 as an operation procedure to be performed by an operator. More specifically, in accordance with the details of the error at the image forming apparatus 1, the first operation to be performed first among the operations provided with "START" is determined.

For example, when "period-designated log collection" is determined as the first operation in accordance with the error at the image forming apparatus 1, the operation procedure image of "period-designated log collection" is displayed on the display 26. Next, the operator performs the operation of "period-designated log collection". After collection of log information for the designated period is completed, the operation procedure image of "job reprocessing" as a connection destination of "period-designated log collection" which is connected by an arrow is displayed on the display 26. Then, the operator performs the operation of "job reprocessing". After the reprocessing of a print job is completed, the operation procedure image of "contact maker" as a connection destination of "job reprocessing" which is connected by an arrow is displayed on the display 26. Here, the operator may contact the maker to report the abnormal status of the image forming apparatus 1 or the like and request the maker for support for recovery.

Furthermore, for example, in the case where operation is started from "log collection (automatic)" in accordance with the error at the image forming apparatus 1, the controller 2 performs collection of log information in accordance with the occurrence of the error. Then, after log collection is completed, the operation procedure image of "system restart" as a connection destination of "log collection (automatic)" which is connected by an arrow is displayed on the display 26. Then, the operator performs the operation of "system restart". After restart of the image forming unit 3 is completed, the operation procedure image of "contact maker" as a connection destination of "system restart" which is connected by an arrow is displayed on the display 26.

FIG. 9 is a diagram illustrating an example of an operation procedure table which defines the operation procedure images illustrated in FIG. 8. In the example illustrated in FIG. 9, nine error groups are provided in accordance with the abnormal status of the image forming apparatus 1. In accordance with each error group, an operation procedure to be performed by an operator is defined. For example, in the case where an error has occurred at the image forming unit 3 and the error corresponds to "group 2", "period-designated log collection" is determined as the first operation, as in the example described above. Then, the operation procedure image of "period-designated log collection" is displayed on the display 26. After that, in accordance with operations by the operator, operation procedure images of "job reprocessing" and "contact maker" are sequentially displayed on the display 26.

Classification as to which one of nine error groups in the processing procedure table individual errors occurring at the image forming apparatus 1 belong to is determined in advance.

As described above, in this exemplary embodiment, in the case where an abnormality has occurred at the image forming apparatus 1, the controller 2 causes an operation procedure image which is associated with an operation to be performed by an operator to be displayed in accordance with the error. Therefore, the operator is able to understand which operation is to be performed when the error occurs at the image forming apparatus 1, and may thus perform the operation based on the displayed operation procedure image. The operator performs the operation in accordance with the operation procedure image, and therefore collection of log information or the like, which is necessary for error analysis for identifying a cause for the abnormality, may be ensured.

Furthermore, in this exemplary embodiment, an operation procedure image is displayed as an image which represents the details of an operation by text or the like. However, such a configuration is not necessarily provided. For example, a diagram or an icon which represents the details of an operation by a drawing or a picture may be displayed as an operation procedure image.

Furthermore, a program for implementing an exemplary embodiment of the present invention may not only be provided by a communication unit but also be stored in a recording medium such as a compact disc-read only memory (CD-ROM) and provided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
an abnormal status detector that detects an abnormal status of an image forming apparatus; and
a display controller that controls a display on an operation screen regarding the image forming apparatus so that, when the abnormal status detector detects the abnormal status, operation procedure images are displayed on the display, the operation procedure images being associated with a plurality of operations defined in advance as operations to be performed by an operator in the abnormal status of the image forming apparatus,
wherein when the information processing apparatus receives a first operation which corresponds to a first operation procedure image displayed on the display, the display controller displays a second operation procedure image which corresponds to a second operation which is defined as the next operation in sequence to the first operation among the plurality of operations, and
in a case where execution of a series of processing operations is designated by the first operation, the second operation procedure image is not displayed until the execution of the series of processing operations is completed.

2. The information processing apparatus according to claim 1, wherein the operation procedure image is displayed on a highest layer of one or more images which are hierarchically displayed on the display.

3. The information processing apparatus according to claim 1, wherein the display controller does not receive an operation which is associated with an image different from the operation procedure image while the operation procedure image is being displayed.

4. The information processing apparatus according to claim 1, wherein the first operation procedure image is converted into an image smaller than the second operation procedure image and the reduced first operation procedure image is displayed while the second operation procedure image is being displayed.

5. The information processing apparatus according to claim 1, wherein the second operation procedure image is displayed instead of the first operation procedure image.

6. An information processing method comprising:
detecting an abnormal status of an image forming apparatus; and
controlling a display on an operation screen regarding the image forming apparatus so that, when the abnormal status is detected, operation procedure images are displayed on the display, the operation procedure images being associated with a plurality of operations defined in advance as operations to be performed by an operator in the abnormal status of the image forming apparatus,
wherein when a first operation which corresponds to a first operation procedure image displayed on the display is received, a second operation procedure image is displayed which corresponds to a second operation which is defined as the next operation in sequence to the first operation among the plurality of operations, and in a case where execution of a series of processing operations is designated by the first operation, the second operation procedure image is not displayed until the execution of the series of processing operations is completed.

7. A non-transitory computer readable medium storing a program causing a computer to execute a process for information processing, the process comprising:

detecting an abnormal status of an image forming apparatus; and controlling a display on an operation screen regarding the image forming apparatus so that, when the abnormal status is detected, operation procedure images are displayed on the display, the operation procedure images being associated with a plurality of operations defined in advance as operations to be performed by an operator in the abnormal status of the image forming apparatus, wherein when a first operation which corresponds to a first operation procedure image displayed on the display is received, a second operation procedure image is displayed which corresponds to a second operation which is defined as the next operation in sequence to the first operation among the plurality of operations, and in a case where execution of a series of processing operations is designated by the first operation, the second operation procedure image is not displayed until the execution of the series of processing operations is completed.

8. An information processing apparatus comprising:

an abnormal status detector that detects an abnormal status of an image forming apparatus; and a display controller that controls a display on an operation screen regarding the image forming apparatus so that, when the abnormal status detector detects the abnormal status, operation procedure images are displayed on the display, the operation procedure images being associated with a plurality of operations defined in advance as operations to be performed by an operator in the abnormal status of the image forming apparatus, wherein when the information processing apparatus receives a first operation which corresponds to a first operation procedure image displayed on the display, the display controller displays a second operation procedure image which corresponds to a second operation which is defined as the next operation in sequence to the first operation among the plurality of operations, and the display controller does not receive an operation which is associated with an image different from the operation procedure image that is displayed while the operation procedure image is being displayed.

* * * * *